US008033451B2

(12) United States Patent
Schwarz, Jr.

(10) Patent No.: US 8,033,451 B2
(45) Date of Patent: *Oct. 11, 2011

(54) SYSTEM AND METHOD FOR FUNDING A COLLECTIVE ACCOUNT BY USE OF AN ELECTRONIC TAG

(75) Inventor: Charles E. Schwarz, Jr., Wilmington, DE (US)

(73) Assignee: JPMorgan Chase Bank, National Association, New York, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/978,856

(22) Filed: Oct. 30, 2007

(65) Prior Publication Data

US 2009/0043651 A1    Feb. 12, 2009

Related U.S. Application Data

(63) Continuation of application No. 11/397,544, filed on Apr. 4, 2006, now Pat. No. 7,311,244, which is a continuation of application No. 10/937,655, filed on Sep. 9, 2004, now Pat. No. 7,051,925, which is a continuation of application No. 09/927,462, filed on Aug. 13, 2001, now Pat. No. 6,945,453.

(51) Int. Cl.
G06K 19/06  (2006.01)
(52) U.S. Cl. ........................ 235/375; 235/492
(58) Field of Classification Search ............ 235/375, 235/380, 382, 384, 451, 492; 340/870.17; 705/1, 13, 14, 17
See application file for complete search history.

(56) References Cited

U.S. PATENT DOCUMENTS

| | | |
|---|---|---|
| 3,555,548 A | 1/1971 | Wyckoff et al. |
| 3,713,235 A | 1/1973 | Roberts |
| 3,946,206 A | 3/1976 | Darjany |
| 4,047,033 A | 9/1977 | Malmberg et al. |
| 4,058,220 A | 11/1977 | Torongo |
| D248,203 S | 6/1978 | Morse |
| 4,130,881 A | 12/1978 | Haessler et al. |
| 4,205,780 A | 6/1980 | Burns et al. |
| 4,264,808 A | 4/1981 | Owens et al. |
| 4,321,672 A | 3/1982 | Braun et al. |
| 4,465,206 A | 8/1984 | Sorel et al. |
| 4,545,838 A | 10/1985 | Minkus et al. |

(Continued)

FOREIGN PATENT DOCUMENTS

CA           2293321      12/1998

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Thien M Le
(74) *Attorney, Agent, or Firm* — Hunton & Williams, LLP

(57) ABSTRACT

A system and method for funding a collective account via aggregating usage of electronic tags is disclosed. The system and method promotes the use of electronic tags, and the funding of collective accounts that may be associated with charitable or other philanthropic causes. Further benefits may be realized by replenishing the prefunded account that serves as the source of funds for the electronic tag to an affinity account that also benefits the charitable or other philanthropic cause.

27 Claims, 4 Drawing Sheets

U.S. PATENT DOCUMENTS

| | | |
|---|---|---|
| 4,582,985 A | 4/1986 | Lofberg |
| 4,614,861 A | 9/1986 | Pavlov et al. |
| 4,634,845 A | 1/1987 | Riley et al. |
| 4,643,452 A | 2/1987 | Chang |
| 4,689,478 A | 8/1987 | Hale et al. |
| 4,700,055 A | 10/1987 | Kashkashian, Jr. |
| 4,746,787 A | 5/1988 | Okada |
| 4,750,119 A | 6/1988 | Robertson et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,054,096 A | 10/1991 | Beizer |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,121,945 A | 6/1992 | Thomson et al. |
| 5,146,068 A | 9/1992 | Ugawa et al. |
| 5,175,416 A | 12/1992 | Mansvelt |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,361,062 A | 11/1994 | Weiss et al. |
| 5,365,575 A | 11/1994 | Katz |
| 5,383,113 A | 1/1995 | Kight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,190 A | 5/1995 | Kopesec |
| 5,424,524 A | 6/1995 | Ruppert et al. |
| 5,444,794 A | 8/1995 | Uhland |
| 5,450,477 A | 9/1995 | Amarant et al. |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,619,558 A | 4/1997 | Jheeta |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |

| | | | | | |
|---|---|---|---|---|---|
| 5,727,153 A | 3/1998 | Powell | 5,920,629 A | 7/1999 | Rosen |
| 5,728,998 A | 3/1998 | Novis et al. | 5,920,844 A | 7/1999 | Hotta et al. |
| 5,729,693 A | 3/1998 | Holda-Fleck | 5,920,847 A | 7/1999 | Kolling et al. |
| 5,734,154 A | 3/1998 | Jachimowicz et al. | 5,923,734 A | 7/1999 | Taskett |
| 5,734,838 A | 3/1998 | Robinson et al. | 5,926,800 A | 7/1999 | Baronowski et al. |
| 5,736,728 A | 4/1998 | Matsubara | 5,930,217 A | 7/1999 | Kayanuma |
| 5,737,421 A | 4/1998 | Audebert | 5,931,764 A | 8/1999 | Freeman et al. |
| 5,740,549 A | 4/1998 | Reilly et al. | 5,933,817 A | 8/1999 | Hucal |
| 5,742,775 A | 4/1998 | King | 5,937,068 A | 8/1999 | Audebert |
| 5,745,049 A | 4/1998 | Akiyama et al. | 5,940,811 A | 8/1999 | Norris |
| 5,745,706 A | 4/1998 | Wolfberg et al. | 5,946,669 A | 8/1999 | Polk |
| 5,749,075 A | 5/1998 | Toader et al. | 5,952,641 A | 9/1999 | Korshun |
| 5,760,381 A | 6/1998 | Stich et al. | 5,953,423 A | 9/1999 | Rosen |
| 5,765,138 A | 6/1998 | Aycock et al. | 5,953,710 A | 9/1999 | Fleming |
| 5,765,141 A | 6/1998 | Spector | 5,955,961 A | 9/1999 | Wallerstein |
| 5,770,843 A | 6/1998 | Rose et al. | 5,956,695 A | 9/1999 | Carrithers et al. |
| 5,770,849 A | 6/1998 | Novis et al. | 5,963,648 A | 10/1999 | Rosen |
| 5,774,870 A | 6/1998 | Storey | 5,963,925 A | 10/1999 | Kolling et al. |
| 5,774,882 A | 6/1998 | Keen | 5,970,479 A | 10/1999 | Shepherd |
| 5,777,305 A | 7/1998 | Smith et al. | 5,970,480 A | 10/1999 | Kalina |
| 5,777,306 A | 7/1998 | Masuda | 5,974,399 A | 10/1999 | Giuliani et al. |
| 5,777,903 A | 7/1998 | Piosenka et al. | RE36,365 E | 11/1999 | Levine et al. |
| 5,778,067 A | 7/1998 | Jones et al. | 5,984,180 A | 11/1999 | Albrecht |
| 5,787,156 A | 7/1998 | Katz | 5,984,191 A | 11/1999 | Chapin, Jr. |
| 5,787,404 A | 7/1998 | Fernandez-Holmann | 5,987,434 A | 11/1999 | Libman |
| 5,789,733 A | 8/1998 | Jachimowicz et al. | 5,988,509 A | 11/1999 | Taskett |
| 5,790,636 A | 8/1998 | Marshall | 5,991,413 A | 11/1999 | Arditti et al. |
| 5,794,207 A | 8/1998 | Walker | 5,991,743 A | 11/1999 | Irving et al. |
| 5,798,950 A | 8/1998 | Fitzgerald | 5,991,748 A | 11/1999 | Taskett |
| 5,799,087 A | 8/1998 | Rosen | 5,991,750 A | 11/1999 | Watson |
| 5,802,176 A | 9/1998 | Audebert | 5,999,596 A | 12/1999 | Walker et al. |
| 5,805,719 A | 9/1998 | Pare et al. | 6,000,608 A | 12/1999 | Dorf |
| 5,806,042 A | 9/1998 | Kelly et al. | 6,000,832 A | 12/1999 | Franklin et al. |
| 5,806,044 A | 9/1998 | Powell | 6,002,383 A | 12/1999 | Shimada |
| 5,806,045 A | 9/1998 | Biorge | 6,003,762 A | 12/1999 | Hayashida |
| 5,807,627 A | 9/1998 | Friend et al. | 6,004,681 A | 12/1999 | Epstein et al. |
| 5,809,478 A | 9/1998 | Greco | 6,006,988 A | 12/1999 | Behrmann et al. |
| 5,814,796 A | 9/1998 | Benson et al. | 6,009,415 A | 12/1999 | Shurling et al. |
| 5,815,657 A | 9/1998 | Williams et al. | 6,014,636 A | 1/2000 | Reeder |
| 5,815,658 A | 9/1998 | Kuriyama | 6,014,638 A | 1/2000 | Burge et al. |
| 5,819,234 A | 10/1998 | Slavin et al. | 6,014,645 A | 1/2000 | Cunningham |
| 5,819,237 A | 10/1998 | Garman | 6,014,749 A | 1/2000 | Gloor et al. |
| 5,826,243 A | 10/1998 | Musmanno et al. | 6,016,482 A | 1/2000 | Molinari et al. |
| 5,832,457 A | 11/1998 | O'Brien | 6,016,954 A | 1/2000 | Abe et al. |
| 5,832,488 A | 11/1998 | Eberhardt | 6,019,284 A | 2/2000 | Freeman et al. |
| 5,835,061 A | 11/1998 | Stewart | 6,021,189 A | 2/2000 | Vu |
| 5,835,576 A | 11/1998 | Katz | 6,026,370 A | 2/2000 | Jermyn |
| 5,839,113 A | 11/1998 | Federau et al. | 6,029,139 A | 2/2000 | Cunningham et al. |
| 5,845,259 A | 12/1998 | West et al. | 6,029,144 A | 2/2000 | Barrett et al. |
| 5,845,260 A | 12/1998 | Nakano et al. | 6,029,890 A | 2/2000 | Austin |
| 5,852,811 A | 12/1998 | Atkins | 6,032,136 A | 2/2000 | Brake, Jr. et al. |
| 5,852,812 A | 12/1998 | Reeder | 6,032,859 A | 3/2000 | Muehlberger et al. |
| 5,857,079 A | 1/1999 | Claus et al. | 6,036,099 A | 3/2000 | Leighton |
| 5,857,175 A | 1/1999 | Day et al. | 6,038,292 A | 3/2000 | Thomas |
| 5,857,709 A | 1/1999 | Chock | 6,038,552 A | 3/2000 | Fleischl et al. |
| 5,859,419 A | 1/1999 | Wynn | 6,041,315 A | 3/2000 | Pollin |
| 5,864,609 A | 1/1999 | Cross et al. | 6,044,360 A | 3/2000 | Picciallo |
| 5,864,828 A | 1/1999 | Atkins | 6,045,042 A | 4/2000 | Ohno |
| 5,864,830 A | 1/1999 | Armetta et al. | 6,047,067 A | 4/2000 | Rosen |
| RE36,116 E | 2/1999 | McCarthy | 6,047,268 A | 4/2000 | Bartoli et al. |
| 5,870,718 A | 2/1999 | Spector | 6,049,463 A | 4/2000 | O'Malley et al. |
| 5,870,721 A | 2/1999 | Norris | 6,049,773 A | 4/2000 | McCormack et al. |
| 5,875,437 A | 2/1999 | Atkins | 6,049,782 A | 4/2000 | Gottesman et al. |
| 5,883,377 A | 3/1999 | Chapin, Jr. | 6,058,378 A | 5/2000 | Clark et al. |
| 5,883,810 A | 3/1999 | Franklin et al. | 6,064,985 A | 5/2000 | Anderson |
| 5,884,271 A | 3/1999 | Pitroda | 6,065,675 A | 5/2000 | Teicher |
| 5,884,278 A | 3/1999 | Powell | 6,068,183 A | 5/2000 | Freeman et al. |
| 5,884,285 A | 3/1999 | Atkins | 6,070,067 A | 5/2000 | Nguyen et al. |
| 5,887,065 A | 3/1999 | Audebert | 6,070,147 A | 5/2000 | Harms et al. |
| 5,890,138 A | 3/1999 | Godin et al. | 6,070,153 A | 5/2000 | Simpson |
| 5,890,140 A | 3/1999 | Clark et al. | 6,076,068 A | 6/2000 | DeLapa et al. |
| H1794 H | 4/1999 | Claus | 6,076,072 A | 6/2000 | Libman |
| 5,897,620 A | 4/1999 | Walker et al. | 6,078,888 A | 6/2000 | Johnson, Jr. |
| 5,897,621 A | 4/1999 | Boesch et al. | 6,078,891 A | 6/2000 | Riordan et al. |
| 5,905,246 A | 5/1999 | Fajkowski | 6,091,817 A | 7/2000 | Bertina et al. |
| 5,907,350 A | 5/1999 | Nemirofsky | 6,092,056 A | 7/2000 | Tull, Jr. et al. |
| 5,911,135 A | 6/1999 | Atkins | 6,095,412 A | 8/2000 | Bertina et al. |
| 5,911,136 A | 6/1999 | Atkins | 6,095,416 A | 8/2000 | Grant et al. |
| 5,914,472 A | 6/1999 | Foladare et al. | 6,098,053 A | 8/2000 | Slater |

| | | |
|---|---|---|
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppichich |
| 6,223,143 B1 | 4/2001 | Weinstock et al. |
| 6,227,447 B1 | 5/2001 | Campisano |
| 6,243,688 B1 | 6/2001 | Kalina |
| 6,263,316 B1 | 7/2001 | Khan et al. |
| 6,265,977 B1 | 7/2001 | Vega et al. |
| 6,278,981 B1 | 8/2001 | Dembo et al. |
| 6,289,322 B1 | 9/2001 | Kitchen et al. |
| 6,295,344 B1 | 9/2001 | Marshall |
| 6,295,522 B1 | 9/2001 | Boesch |
| 6,298,336 B1 | 10/2001 | Davis et al. |
| 6,308,268 B1 | 10/2001 | Audebert |
| 6,324,524 B1 | 11/2001 | Lent et al. |
| 6,330,546 B1 | 12/2001 | Gopinathan et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,490,568 B1 | 12/2002 | Omara et al. |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B1 | 1/2004 | LaBlanc et al. |
| 6,675,149 B1 | 1/2004 | Ruffin et al. |
| 6,687,222 B1 | 2/2004 | Mittal et al. |
| 6,693,544 B1 | 2/2004 | Hebbecker |
| 6,732,919 B2 | 5/2004 | Macklin et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D495,736 S | 9/2004 | Scharf |
| 6,793,135 B1 | 9/2004 | Ryoo |
| 6,802,008 B1 | 10/2004 | Ikefuji et al. |
| 6,805,287 B2 | 10/2004 | Bishop |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,945,453 B1 * | 9/2005 | Schwarz Jr. .................. 235/375 |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,051,925 B2 * | 5/2006 | Schwarz, Jr. .................. 235/375 |
| 7,072,864 B2 | 7/2006 | Brake, Jr. et al. |
| 7,072,909 B2 | 7/2006 | Polk |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,165,049 B2 | 1/2007 | Slater |
| D538,349 S | 3/2007 | Hollands |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,252,223 B2 | 8/2007 | Schofield |
| D551,705 S | 9/2007 | Mershon |

| | | |
|---|---|---|
| 7,295,999 B1 | 11/2007 | Simon et al. |
| 7,306,141 B1 * | 12/2007 | Schwarz, Jr. .................. 235/375 |
| 7,311,244 B1 * | 12/2007 | Schwarz, Jr. .................. 235/375 |
| 7,315,843 B2 | 1/2008 | Diveley et al. |
| 7,346,567 B2 | 3/2008 | Weeks |
| 7,349,866 B2 * | 3/2008 | Schwarz, Jr. .................. 705/14 |
| 7,392,222 B1 | 6/2008 | Hamilton et al. |
| 7,392,224 B1 | 6/2008 | Bauer et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019793 A1 | 2/2002 | Frattalone |
| 2002/0019803 A1 | 2/2002 | Muller |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0138418 A1 | 9/2002 | Zarin et al. |
| 2002/0143703 A1 | 10/2002 | Razvan et al. |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0018613 A1 | 1/2003 | Oytac |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0074290 A1 | 4/2003 | Clore |
| 2003/0101119 A1 | 5/2003 | Parsons et al. |
| 2003/0105672 A1 | 6/2003 | Epstein et al. |
| 2003/0110111 A1 | 6/2003 | Nalebuff et al. |
| 2003/0126017 A1 | 7/2003 | Rau et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0187787 A1 | 10/2003 | Freund |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0216965 A1 | 11/2003 | Libman |
| 2003/0229525 A1 | 12/2003 | Callahan et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0193539 A1 | 9/2004 | Sullivan |
| 2004/0210498 A1 | 10/2004 | Freund |
| 2004/0215507 A1 | 10/2004 | Levitt et al. |
| 2004/0243498 A1 | 12/2004 | Duke |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0035192 A1 | 2/2005 | Bonalle et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0102228 A1 | 5/2005 | Srinivasan et al. |
| 2005/0108152 A1 | 5/2005 | Tsoa Lee et al. |
| 2005/0119979 A1 | 6/2005 | Murashita et al. |
| 2005/0171898 A1 | 8/2005 | Bishop et al. |
| 2005/0199705 A1 | 9/2005 | Beck et al. |
| 2005/0234771 A1 | 10/2005 | Register et al. |
| 2005/0269396 A1 | 12/2005 | Schofield |
| 2006/0026092 A1 | 2/2006 | Klein et al. |
| 2006/0036553 A1 | 2/2006 | Gupta et al. |
| 2006/0047573 A1 | 3/2006 | Mitchell et al. |
| 2006/0047589 A1 | 3/2006 | Grau |
| 2006/0074794 A1 | 4/2006 | Nespola |
| 2006/0085334 A1 | 4/2006 | Murphy |
| 2006/0106696 A1 | 5/2006 | Carlson et al. |
| 2006/0116903 A1 | 6/2006 | Becerra |
| 2006/0122918 A1 | 6/2006 | Graboske et al. |
| 2006/0131869 A1 | 6/2006 | Brignull |
| 2006/0178937 A1 | 8/2006 | Rau et al. |
| 2006/0224480 A1 | 10/2006 | Bent et al. |
| 2006/0242057 A1 | 10/2006 | Velarde |
| 2006/0251478 A1 | 11/2006 | Desmeules |
| 2007/0094084 A1 | 4/2007 | Rau et al. |
| 2007/0094154 A1 | 4/2007 | Rau et al. |
| 2007/0228144 A1 | 10/2007 | Knackstedt et al. |
| 2007/0265924 A1 | 11/2007 | Schwarz, Jr. |
| 2008/0010202 A1 | 1/2008 | Schwarz, Jr. |
| 2008/0177659 A1 | 7/2008 | Lacey et al. |
| 2008/0218841 A1 | 9/2008 | Iwasaki et al. |
| 2009/0192906 A1 | 7/2009 | Rau et al. |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99/54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |

OTHER PUBLICATIONS

Song, A Card That Asks for ID, TIme Magazine, Apr. 12, 2004, 1 page.
A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issues/issue7_3/claessens, retrieved from the Internet on Oct. 6, 2006.
Hotchkiss, ATM's at the head of their class, Bank Marketing, vol. 29, No. 3, Mar. 1997, pp. 26-32.
Edwards, ATMs the Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value Card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http: \\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: for Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Judy Quinn, Incentive Cards Explained, Incentive, Dec. 1995, 5 pages.
Vincent Alonzo, Incentive Marketing . . . Three If By Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Clark, Microsoft, Visa to Jointly Develop PC Electronic-Shopping Software, The Wall Street Journal, Nov. 9, 1994, Nov. 9, 1994 WSJ B9.
More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-Call-ATT Campaign Promotes One Number for All Calls, AT&T Marketing, News Release, www.att.com/press/0297/970217.csa.htm, Feb. 17, 1997, 2 pages.

Allen et al., Overview of Smart Cards and the Industry, Smart Cards: Seizing Strategic Business Opportunities, Chapter 1, p. 2-20, Irwin Professional Publishing, 1997.

Paper or Plastic? With these three incentives, The Choice is Yours, Incentive, Feb. 1996, 2 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stoughton, The Gift of Credit, www.washingtonpost.com/wp-srv/business, Dec. 14, 1998.

Nora Wood, The Power of the Card, Incentive, Jul. 1997, 6 pages.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans for Cross Border Visa Cash Based on CEPS, www.visa.com/av/news/praaamisc111699.vhtmI, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome to Card Express CardEx, CardEx website archived by web.archive on Oct. 31, 1996, http://web.archive.org/web/*/http://www.cardex.com, retrieve Oct. 18, 2003, 7 pages.

Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

Swiftgift, Welcome to Swiftgift, www.swiftgiftcard.com, Dec. 8, 1998, 10 pages.

Kenneth Hein, What's the Deal?, Incentive, Jul. 1998, 7 pages.

Machlis et al., Will smart cards replace ATMS?, Computerworld, printed Feb. 23, 2001, 3 pages.

Award Card Comparison, JA7922, Nov. 1995.

Card Based Award Systems, JA8309, Nov. 1995.

Hight, Jim, Consulting Services, www.strategies-tactics.com, Oct. 2002.

Glossman, et al., Glossman, et al., Citicorp Company Report, Report No. 1647151, p. 8 of 16, (2005).

Hamey, Kenneth, Home Asset Management Accounts Link Mortgages Equity Lines, Oct. 5, 2002.

How Is It Different?, JA8331, Apr. 1992.

Incenticard, Bellsouth, JA8329, Jun. 2000.

Incentive Firms Find Debit Cards A Rewarding Experience (Off-line debit card issuers converge efforts with companies looking for effective incentives to boost employee productivity and to motivate individuals to buy their products), Debit Card News, vol. 3, Nov. 1997.

Meridian Award Cards, JA8251, Jul. 2000.

Meridian—the leader in card marketing, JA8343, Aug. 1989.

Meridicard vs. Debit Cards, JA7917, Aug. 1989.

Schwab, Charles, Now 7 Ways for a better Total Return for Your Money; Schwat 1, The Inventor's Asset Management Account, Charles R. Schwab, Charles Schwab & Co., Inc., 16 pages, (1987).

Rossman, Kenneth, Summary Appraisal of Real Property, Feb. 2002.

The Federal Transit Administration, TCRP Report 32 Multipurpose Transit Payment Media, Chapter 2 Multipurpose Fare Payment: Overview, p. 10-20 (1998).

Wells Fargo Blazes New Trail for Homeowners, Oct. 2, 2002.

* cited by examiner

US 8,033,451 B2

SYSTEM AND METHOD FOR FUNDING A COLLECTIVE ACCOUNT BY USE OF AN ELECTRONIC TAG

RELATED APPLICATIONS

This is a continuation application of U.S. patent application Ser. No. 11/397,544, filed on Apr. 4, 2006 now U.S. Pat. No. 7,311,244, which is a continuation of U.S. patent application Ser. No. 10/937,655, filed on Sep. 9, 2004, now U.S. Pat. No. 7,051,925, which is a continuation of U.S. patent application Ser. No. 09/927,462, filed on Aug. 13, 2001 and now U.S. Pat. No. 6,945,453. The contents of this application and these patents are herein incorporated by reference.

FIELD OF THE INVENTION

The invention relates generally to the funding of collective accounts through the use of electronic tags ("tag" or "tags"). More specifically, the invention relates to systems and methods for funding a collective account that may be used for a variety of purposes, such as making charitable contributions or otherwise contributing to causes, based on tag usage and the "float" of a prefunded account associated with a tag.

BACKGROUND OF THE INVENTION

Electronic tags are used today to conduct various financial transactions. For instance, the Mobil® division of ExxonMobil Corporation sponsors a program called SPEEDPASS® whereby a customer can purchase gas and other goods and services by activating a system with a tag containing a transponder, where the tag is associated with some source of the customer's funds which are used to pay for the purchase. The tag may be kept on a keyring, and is waved in front of a detector to activate the system.

Another popular, rapidly growing use of electronic tags is in Electronic Toll Collection ("ETC") systems including E-Z PASS,® GEORGIA CRUISE CARD,® SUNPASS,® EPASS,® and FASTRAK,® among others, which allow a motorist to electronically charge a toll for using certain roadways without having to physically stop at a tollbooth to pay the toll. ETC systems are a part of the technology known as Intelligent Transportation Systems ("ITS") fostered by the Intelligent Transportation Society of America ("ITSA"), a society composed of private and public members which was mandated by the United States Congress in the Intermodal Surface Transportation Efficiency Act of 1991 ("ISTEA") to coordinate the development and deployment of intelligent transportation systems in the United States. ETC systems enhance the safety, capacity, and efficiency of the tollway systems in this country, as well as improve customer service and satisfaction. In addition, ETC systems improve air quality by reducing the number of vehicles which sit at idle speed at tollbooths.

The users of these tags generally associate a prefunded account to serve as a source of funds to pay for charges made with their tags, where the prefunded account balance is referred to as the "float." These prefunded accounts are maintained by the ETC system operator, who invests the account balances and makes a profit off this "float." The user may automatically replenish the prefunded account by instructing the system to charge additional "float" to an individual checking, savings, or credit card account or other source of funds that is associated with the tag when the prefunded account balance reaches a low limit, or the user may manually replenish the prefunded account balance.

ETC systems operate by detecting some tag identification information associated with the tag using some type of sensor as the motorist passes through a tollbooth or otherwise activates the sensor and determining which prefunded account is associated with that tag. Tag identification information may be contained in bar coded labels, which are placed on the vehicle and detected by laser scanners at the tollbooth. Alternatively, tag identification information may be transmitted via an RF or IR or other type of transponder located in the tag, where the emitted signal is read by a reader/antenna located at the tollbooth. Often the tags are intended to be attached to the motorist's front windshield or side window by some type of adhesive, and are, for the most part, contained in generic plastic casings which many consider unattractive to display.

When the tag identification information is detected by a scanner or reader/antenna at a tollbooth, the prefunded account associated with that tag is debited the amount of the corresponding toll or charge. Annual toll revenues for the nation's toll roads which use ETC systems easily exceed one billion dollars a year,[1] so enrollment of users in the nation's ETC systems contemplates a significant "float" potentially to be held by ETC systems operators.

[1] According to data compiled during the years of 1996 through 1999 by the ETTM, a component of the Intelligent Transportation Systems (ITS). See www.ettm.com/usafac.html.

Some potential ETC users currently do not enroll in the systems because they do not want to leave their money in the prefunded account where they lose the use of the account balance, and where they are committed to spending the prefunded account balance with the ETC system operator. Further, as noted, the tags currently used are considered plain and unattractive, which may lead some motorists not to mount the tags on their windshields, creating a safety hazard as those motorists fumble to find the tag to pay the toll.

SUMMARY OF THE INVENTION

The method and system of the invention overcomes these problems of the prior art, and adds an incentive for potential users to sign up for and to use ETC tag systems. As well, the invention provides ETC systems operators an incentive to make charitable and other contributions based on the users' tag usage and "float."

It is feature of the invention to provide a method and system for funding a collective account with a reward based either on aggregate tag usage of a plurality of tags associated with that collective account or on the aggregate of prefunded account balances for a plurality of prefunded accounts associated with the collective account.

It is another feature of the invention to provide an incentive for potential users of electronic tag systems to open and prefund accounts with electronic tag system operators.

It is yet another feature of the invention to facilitate a method for electronic tag systems operators to make charitable and other financial contributions.

It is yet another feature of the invention to provide an electronic tag that will increase public awareness of charitable or other political or educational causes.

It is yet another feature of the invention to facilitate the earning of rewards in a loyalty program sponsored by or otherwise associated with a for-profit or retail program, where the tag is associated with an individual account that is associated with the loyalty program.

It is another feature of the invention to provide an additional benefit to holders of collective accounts by prefunding accounts with individual accounts that are associated with and benefit the holders of the collective accounts through affinity programs.

It is another feature of the invention to encourage use of ETC systems by motorists and thereby benefiting the environment.

It is yet another feature of the invention to increase safety at tollbooths by providing an electronic tag that motorists will want to install on their windshields.

One aspect of the invention relates to a method and system for funding a collective account comprising a plurality of tags and prefunded accounts associated with those tags, associating the tags or the "float" of the prefunded accounts to the collective account, aggregating either the tag usage or the prefunded account balances, calculating a reward based on the aggregate tag usage or prefunded account balances, and funding the reward to the collective account. The funds in the collective account may be used for a variety of purposes, such as making charitable contributions, funding political campaigns, or making contributions to religious or civic groups or educational institutions.

Another aspect of the invention relates to decorating a tag with a symbol, name, or color scheme of the target organization. Not only does such decoration increase public awareness of the tagholder's chosen cause, but it also increases the likelihood that the user (if a motorist) installs the tag on the windshield of the vehicle which increases highway safety by reducing motorist distraction as he or she fumbles to locate the tag as he or she approaches the toll booth.

Another aspect of the invention relates to a method and system for associating a prefunded account for a tag with an individual account that is itself associated with a loyalty program, and increasing credits in the loyalty program through use of the electronic tag. These loyalty program credits may inure to the benefit of the tagholder, as for example where the individual account amasses cash bonuses or frequent flyer miles upon individual account usage. Alternatively, the loyalty program benefits may inure to a charitable or other organization, as where the individual account is an affinity account that makes a contribution to a chosen card based on individual account usage. Further, an organization that is the beneficiary of both an affinity program associated with an individual account associated with a tag and is also the holder of a collective account associated with the same tag may receive double benefits from tag usage.

As used in this specification, the terms "tag" and "tags" refer to any known or later developed device or object, associated in some manner to a source of funds, that may be used to activate a system for automatically making purchases of goods or services and charge the purchase of those goods or services to the associated source of funds. The associated source of funds may itself be a prefunded account, and may also be associated with at least one other source of funds, as an individual account, to replenish the prefunded account balance.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
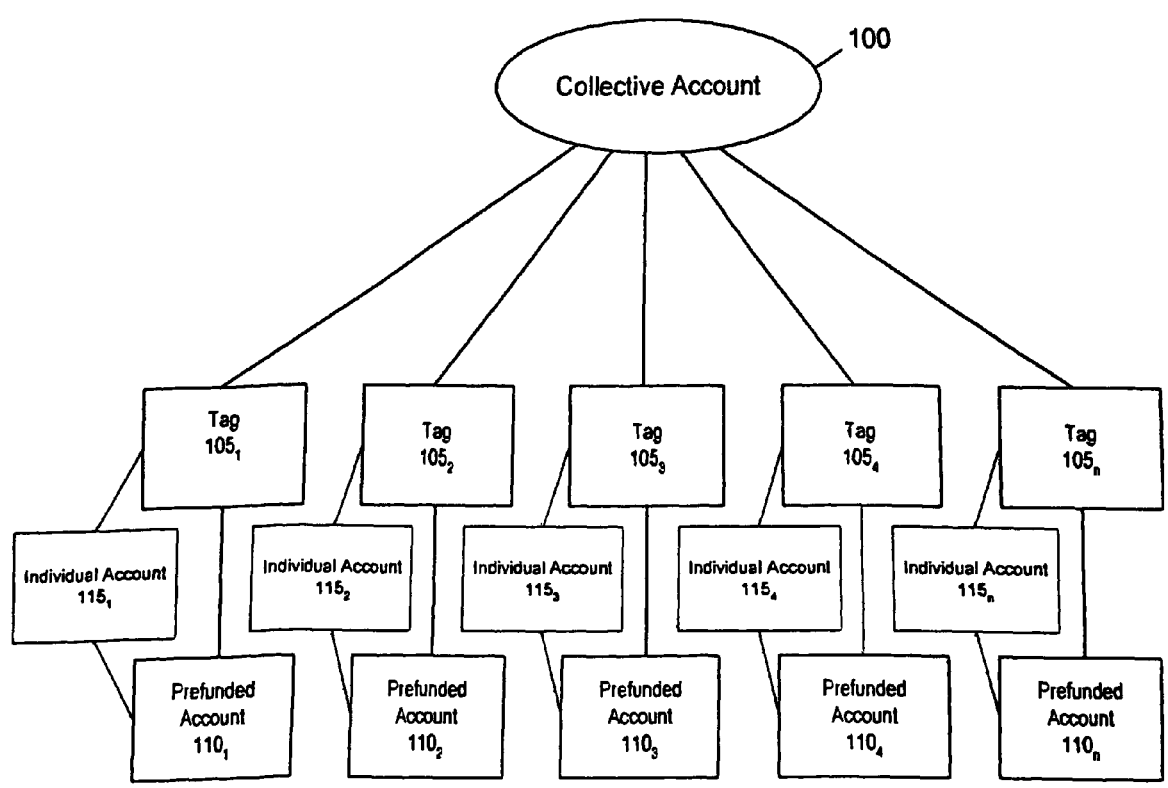
FIG. 1 is a schematic of one embodiment of the invention illustrating a plurality of tags each associated with an individual account, a prefunded account, and a collective account.

The invention relates generally to a method and system for funding a collective account though the use of electronic tags, or through profits made off the "float" of the prefunded accounts associated with those tags. One embodiment of the invention may comprise associating each of a plurality of tags to a prefunded account and a collective account, or alternatively associating the prefunded account directly to the collective account. The invention further comprises aggregating tag usage for all associated tags in the collective account. A reward may be calculated based on the aggregate tag usage for all tags associated with the collective account and the reward credited to the collective account, thus providing an incentive for tagholders to increase their use of ETC systems. The above steps can be accomplished in real time or on a periodic basis. The funds in the collective account may be used for a variety of purposes as, for example, funding of charitable, religious, political, or educational institutions. Individual tagholders may be members of the organization that is the holder of the collective account.

According to another embodiment of the invention, the reward to the collective account may be calculated based on the aggregate prefunded account balances for all prefunded accounts associated with the collective account, thus providing an incentive for tagholders to increase the "float" amounts kept in their prefunded accounts.

In another embodiment of the invention, the system operator may establish a number of collective accounts and designate each collective account for a particular purpose as an environmental purpose, charitable purpose, etc. Tagholders may associate all or a portion of their prefunded accounts and/or tag usage to one or more collective accounts. In this embodiment, it is not necessary that tagholders be members of any organization that is the holder of the collective account, and a single tagholder may associate his or her prefunded account and/or tag usage in percentages to multiple collective accounts.

Tagholders may be issued periodic reporting statements detailing the contributions made in relation to the association of their prefunded accounts and/or tags to collective accounts.

Another embodiment of the invention relates to a computer-based system for funding a collective account, wherein a tag is associated with prefunded and collective accounts. The system may include a host computer capable of programmed response and software capable of monitoring individual tag usage or prefunded account balances, aggregating tag usage or prefunded account balances, and calculating a bonus based on the aggregate tag usage or prefunded account balances of all prefunded accounts associated with a particular collective account. The computer may perform other functions as generating statements of the prefunded accounts to the tagholders and statements of the collective account to the holder of the collective account, and may also be capable of automatically initiating a funds transfer from an individual account associated with the tag and/or prefunded account to replenish the prefunded account based upon predetermined conditions, such as low prefunded account balance. In addition, a plurality of remote computers may be networked or otherwise capable of communicating with the host computer, where the remote computers are associated with reader/antennas at tollbooths or other sites where a tag may be used to purchase a good or service. The reader/antennas may be capable of detecting tag identification information and transmitting the tag identification information along with the charge to the remote computers, which can then transmit the information to the host computer to charge the associated prefunded account for that tag. Alternatively, remote computers may access the host computer for tag identification information, and identify the prefunded account before transmission of the charge information to the host computer.

In another embodiment of the invention, the tag and prefunded account may be associated with an individual account used as a source of funds to replenish the prefunded account based on fulfillment of predetermined conditions, as for example a predetermined low balance amount in the prefunded account. The individual account may be an affinity account, where an organization receives a benefit from use of the individual account. If the affinity organization is also the holder of the collective account, that organization can realize a double benefit from a tagholder's use of the tag—both from the affinity program when the individual account is used to fund the prefunded account, and again when the reward is calculated and awarded based on tag usage, in other embodiments, the individual account may be associated with a loyalty program, where benefits accrue directly to the tagholder upon use of the individual account. In this scenario, increased tag usage benefits the holder of the collective account, and also causes increased needs to replenish the prefunded account, which then benefits the tagholder directly by increased loyalty program credits.

The presence of an LED and/or LCD readout in the tag allows the user to view such information as remaining balance in his or her prefunded account or to receive and/or view messages transmitted from the reader/antenna. The tag may also have the ability to generate a sound that indicates a successful detection by the reader/antenna or a low prefunded account balance which might be a theme song associated with the holder of the collective account, as for example the fight song of a selected university. The tag may have a communication port to allow it to communicate with other devices, as for example relaying traffic information received from the reader/antenna to a device capable of reading and mapping out the relayed information within a vehicle or some remote or hard wired device.

The holder of the collective account can be an organization comprising a plurality of members. However, the tagholders are not necessarily members of the holder of the collective account, as the tagholders may designate different causes to receive the reward. The collective account may also comprise one or more sub-accounts, where each sub-account is designated for a different purpose.

The reward may be calculated in a number of ways. For example, the reward may be based on aggregate tag usage or aggregate "float" of the prefunded account balances associated with the collective account calculated over some period of time. Alternatively, the reward may be customized by basing it on a comparison of aggregate tag usage or aggregate "float" of the prefunded account balances during a given period to historic performance, where increased performance in the given period results in a proportionately greater reward. Alternatively, a minimum performance standard may be set to achieve any reward to be credited to the collective account.

Although the invention is described in terms of electronic tags associated with prefunded accounts, collective accounts, and individual accounts, this description is not intended to limit the invention but is rather one embodiment as will be apparent to those skilled in the art.

Referring now to FIG. 1, a schematic of one embodiment of the invention is detailed for funding a collective account 100 such as a charitable contribution account. The invention comprises a plurality of tags $105_1$ through $105_n$, each tag associated with at least one prefunded account $110_1$ through $110_n$. Also, each tag may be associated with a collective account 100, as selected by the tagholder. Alternatively, each prefunded account $110_n$ may be associated directly with the collective account 100, or each tag $105_n$ may be associated with multiple collective accounts (not shown). The invention further comprises aggregating the tag usage for at least some of the tags associated with the collective account 100, calculating a reward based on the aggregate tag usage, and funding the collective account 100 with the calculated reward. Alternatively, for tags associated with multiple collective accounts, the tagholder may select the percentage of tag usage to be associated with each collective account. In other embodiments, account balances of prefunded accounts $110_1$ through $110_n$ may be aggregated for purposes of calculating the reward. The tags and prefunded accounts may also be associated with individual accounts $115_1$ through $115_n$, which maybe used as a source of funds to replenish the prefunded accounts $110_1$ through $110_n$ upon fulfillment of a predetermined condition, as a low prefunded account balance.

Figure 2:
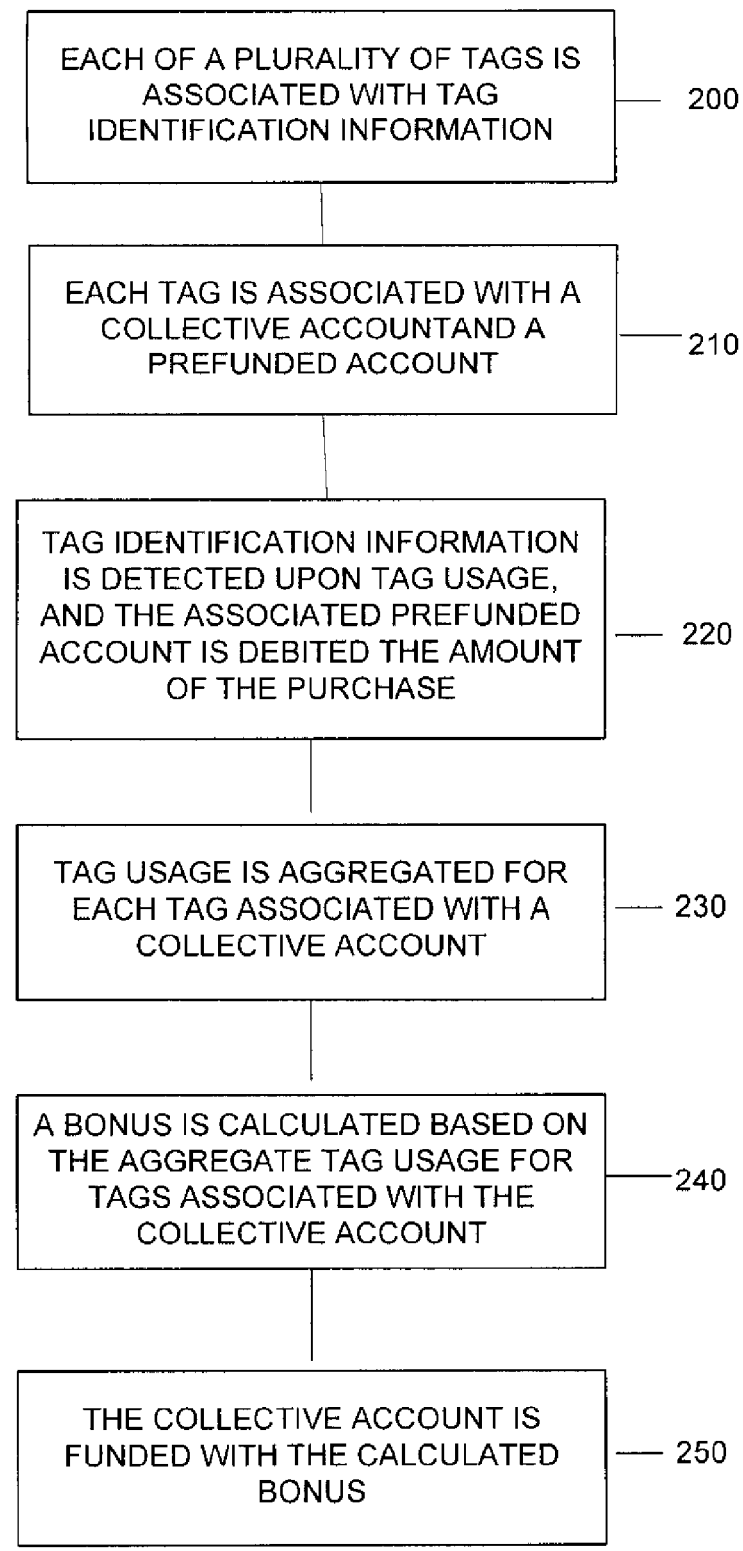
FIG. 2 is a flowscheme of one embodiment of the invention.

A flowscheme of one embodiment of the invention is shown in FIG. 2. At 200, each tag is associated with some tag identification information, which could be detected in various manners as IR or RF transmissions or bar code scanners. At 210, each tag is associated with a prefunded account within the ETC system as well as at least one collective account. When the tag identification information is detected by a reader/antenna during tag usage at 220, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. Tag usage, or portion of tag usage, can be aggregated for each tag associated with the collective account at 230. At 240, a bonus or reward can be calculated based on aggregate tag usage for a collective account, which is credited to the collective account at 250.

Figure 3:
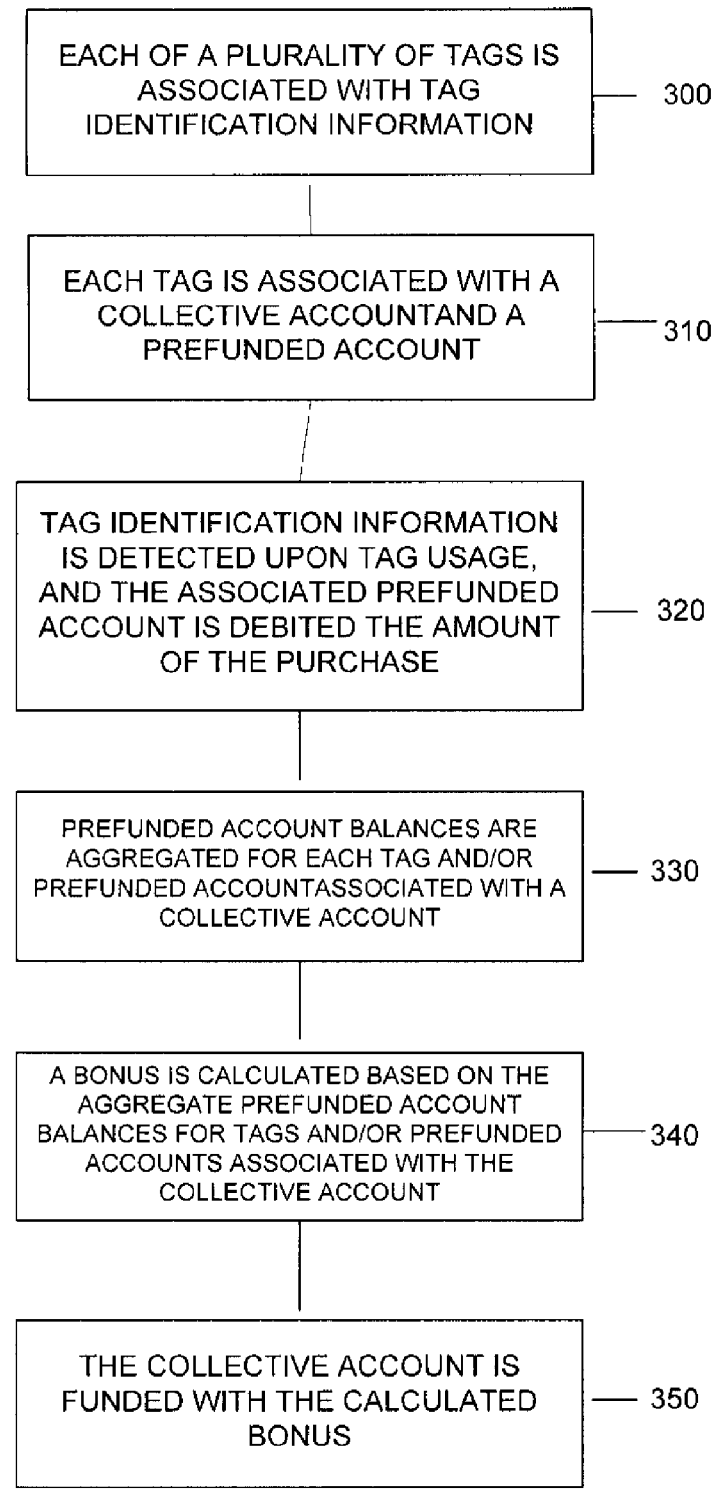
FIG. 3 is a flowscheme of an alternative embodiment of the invention

A flowscheme of an alternative embodiment of the invention is shown in FIG. 3. At 300, each tag is associated with some tag identification information, which could be detected in various manners as IR or RF transmissions or bar code scanners. At 310, each tag is associated with a prefunded account within the ETC system as well as at least one collective account. When the tag identification information is detected by a reader/antenna during tag usage at 320, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. On some periodic basis, prefunded account balances can be aggregated for each prefunded account associated directly with, or indirectly through a tag with, the collective account at 330. At 340, a bonus or reward can be calculated based on aggregate prefunded account balances for a collective account, which is credited to the collective account at 350.

Figure 4:
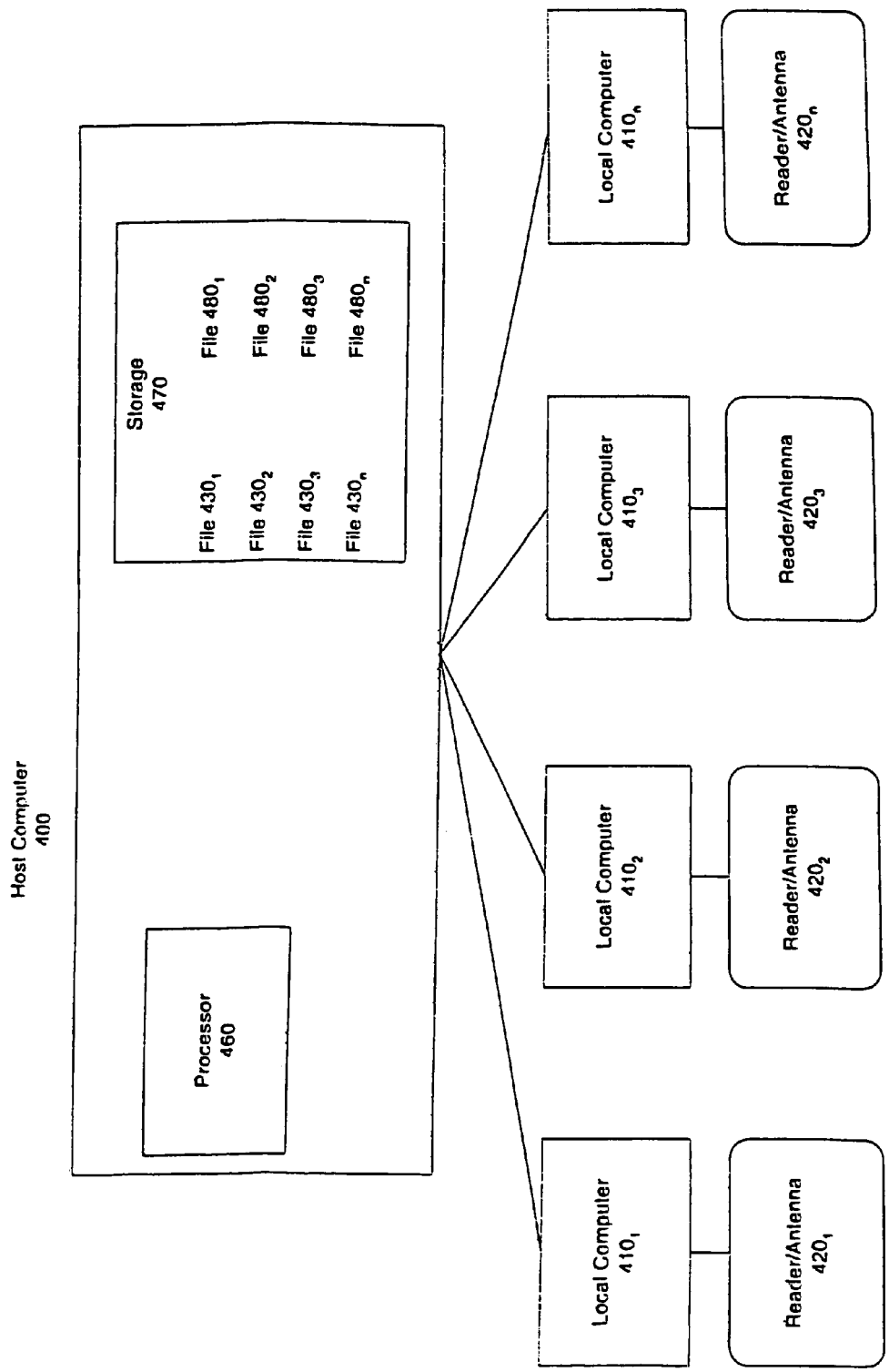
FIG. 4 is a schematic of a computer-based system for funding a collective account.

Referring to FIG. 4, one embodiment of a computer-based system for funding a collective account is described. The ETC system may have a host computer 400, a plurality of remote computers $410_1$ through $410_n$, and a plurality of reader/antennas $420_1$ through $420_n$ associated with remote computers $410_1$ through $410_n$. The host computer has a processor 460 capable of programmed response, and also has a storage unit 470, which may comprise a hard drive or other magnetic, solid state or other storage media, for storing applications, data, operating system and other information.

Upon or anytime after tagholder enrollment with the ETC, searchable indexed computer files $430_1$ through $430_n$ are created by the host computer processor 460 for each enrolled tagholder and stored in the host computer storage 470. The files $430_1$ through $430_n$ may contain such information as an individual tagholder's name, address, tag identification information, prefunded account information, tag usage, and selected collective account(s). The files $430_1$ through $430_n$ may also contain information identifying individual accounts that may be used to replenish the prefunded account balances. Each account can be indexed by the tag identification information, name, and selected collective account. Also, files $480_1$ through $480_n$ may be created by processor 460 and stored in storage 470 containing information for a plurality of collective accounts.

A plurality of readers/antenna $420_1$ through $420_n$ may be located at remote locations from the host computer 400 at the sights where the tagholders use the tags to purchase goods or services. The tag can transmit or is otherwise detectable to provide the tag identification information. Each reader/antenna $420_n$ may be associated with and capable of communicating with a remote computer $410_n$, where each remote computer is capable of communicating with and transmitting information to and receiving information from the host computer 400. In addition, each local computer $410_n$ may also have a processor capable of programmable response and storage capability.

When a tag is detected by the reader/antenna $420_n$ for a purchase of a good or a service, tag identification information can be recorded in the local computer $410_n$ along with the amount of the charge. Either in real time or on a periodic basis, the local computer $410_n$ can communicate with the host computer 400 and transmit the detected tag identification information along with the associated charge amount. Using the tag identification information, the host computer 400 can access the file $430_n$ indexed by that tag identification information, and debit the prefunded account associated with that file for the charge amount.

Either in real time or on a periodic basis, the processor 460 of the host computer 400 can access all tags and/or prefunded accounts that are associated with a certain collective account $480_n$ and either aggregate the total tag usage or the "float" of the prefunded account balances for the prefunded accounts associated with that collective account. A reward can be calculated based on these aggregates, and the processor 460 can initiate a funds transfer in an amount equal to the reward to the collective account $480_n$.

The foregoing embodiments have been presented for the purpose of illustration and description only and are not to be construed as limiting the scope of the invention in any way. The scope of the invention is to be determined from the claims appended hereto.

What is claimed is:

1. A method for distributing a reward, comprising:
   associating by a financial institution an RFID tag with an individual account and the financial institution, wherein a tagholder is the holder of the individual account, wherein further the financial institution comprises one or more host computers;
   aggregating by the financial institution purchase amounts for purchases made from a plurality of merchants using the individual account as a payment source;
   determining by the financial institution if any of the purchases that were made using the individual account as a payment source were made by presenting the RFID tag to merchants;
   aggregating by the financial institution purchase amounts for purchases made from a plurality of merchants by presenting the RFID tag to merchants;
   calculating by a host computer a reward based at least in part on RFID tag usage; and
   attributing the reward to the individual account.

2. The method of claim 1, wherein RFID tag usage comprises the purchase amount of a purchase of at least one of goods or services from a merchant when the RFID tag is presented to the merchant at time of purchase, the number of uses of the RFID tag to enable a purchase, the number of uses of the RFID tag to facilitate access to an ATM device or combinations therein.

3. The method of claim 1, wherein the RFID tag is branded with a symbol, name, colors or combinations thereof.

4. The method of claim 1, wherein the RFID tag comprises a sound generating device.

5. The method of claim 1, wherein the reward comprises cash, airline miles, reward points, services, goods, rebates, up front payments, statement credit, discounts, interest, facilitation of access, activation of a device, enablement of a non-financial transaction, one or more lottery tickets, one or more sweepstakes entries, one or more chances to win a prize or combinations thereof.

6. The method of claim 1, wherein the RFID tag comprises an LED or an LCD controllable via the tagholder.

7. The method of claim 1, wherein the RFID tag comprises at least one communication port allowing the tag to communicate with other devices.

8. The method of claim 1, wherein the RFID tag comprises at least one of a smart card, a plastic card, a bar coded sticker, a transponder readable by a reader/antenna, or combinations thereof.

9. The method of claim 1, wherein the individual account comprises a credit account, a debit account, a stored value account, a home equity line of credit account, a mutual fund account, a money market account, a savings account, a checking account, a nonchecking deposit account, a telephone card account, a rewards account, a special premises account for use by employees of an entity or a margin account.

10. The method of claim 1, wherein the reward is one of automatically distributed to the individual account substantially upon RFID tag usage or automatically distributed to the individual account periodically.

11. The method of claim 1, wherein the RFID tag is embedded in a key, a fob, a token, a pager, a watch, a PDA, a cellular phone, clothing or a plastic card.

12. The method of claim 1, wherein the RFID tag is one of physically presented to the merchant at a point of sale device, physically presented at a place of business, presented to the merchant over a network, presented to the merchant over a telephone connection or physically presented to facilitate access to an ATM machine.

13. The method of claim 1, further comprising:
associating the RFID tag with at least one prefunded account, wherein the prefunded account has a balance;
maintaining at least one of the prefunded accounts; and
debiting the balance of at least one of the prefunded accounts in an amount related to RFID tag usage.

14. A system for distributing a reward, comprising:
a central processor of a financial institution configured to associate an RFID tag with an individual account, the financial institution and at least one organization, wherein a tagholder is the holder of the individual account, wherein further the financial institution comprises one or more host computers,
wherein the host computer is configured to aggregate purchase amounts for purchases made from a plurality of merchants using the individual account as a payment source;
wherein the host computer is further configured to determine if any of the purchases that were made using the individual account as a payment source were made by presenting the RFID tag to merchants and then to aggregate purchase amounts for purchases from a plurality of merchants that were made by presenting the RFID tag to merchants;
wherein further the host computer is configured to calculate a reward based at least in part on RFID tag usage;
wherein the reward is attributed to the individual account.

15. The system of claim 14, wherein RFID tag usage comprises the purchase amount of a purchase of at least one of goods or services from a merchant when the RFID tag is presented to the merchant at time of purchase, the number of uses of the RFID tag to enable a purchase, the number of uses of the RFID tag to facilitate access to an ATM device or combinations therein.

16. The system of claim 15, wherein the reward is based at least in part on information supplied by the at least one organization.

17. The system of claim 15, wherein the RFID tag comprises at least one of a smart card, a plastic card, a bar coded sticker, a transponder readable by a reader/antenna, or combinations thereof.

18. The system of claim 14, wherein the RFID tag is branded with a symbol, name, colors or combinations thereof.

19. The system of claim 14, wherein the RFID tag comprises a sound generating device.

20. The system of claim 14, wherein the reward comprises cash, airline miles, reward points, services, goods, rebates, up front payments, statement credit, discounts, interest, facilitation of access, activation of a device, enablement of a nonfinancial transaction, one or more lottery tickets, one or more sweepstakes entries, one or more chances to win a prize or combinations thereof.

21. The system of claim 14, wherein the RFID tag comprises an LED or an LCD controllable via the tagholder.

22. The system of claim 14, wherein the RFID tag comprises at least one communication port allowing the tag to communicate with other devices.

23. The system of claim 14, wherein the individual account comprises a credit account, a debit account, a stored value account, a home equity line of credit account, a mutual fund account, a money market account, a savings account, a checking account, a nonchecking deposit account, a telephone card account, a rewards account, a special premises account for use by employees of an entity or a margin account.

24. The system of claim 14, wherein the processor is further programmed to automatically distribute the reward to the individual account either substantially upon RFID tag usage or to automatically distribute the first reward to the individual account periodically.

25. The system of claim 14, wherein the RFID tag is embedded in a key, a fob, a token, a pager, a watch, a PDA, a cellular phone, clothing or a plastic card.

26. The system of claim 14, wherein the RFID tag is one of physically presented to the merchant at a point of sale device, physically presented at a place of business, presented to the merchant over a network, presented to the merchant over a telephone connection or physically presented to facilitate access to an ATM machine.

27. The system of claim 14, wherein the RFID tag is associated with at least one prefunded account, wherein the prefunded account has a balance, wherein further the balance of the prefunded account is debited in an amount related to RFID tag usage.

* * * * *